(12) United States Patent
Higuchi et al.

(10) Patent No.: US 11,911,861 B2
(45) Date of Patent: Feb. 27, 2024

(54) MACHINING SYSTEM

(71) Applicant: DMG MORI CO., LTD., Yamatokoriyama (JP)

(72) Inventors: Takayuki Higuchi, Yamatokoriyama (JP); Hiroshi Yasuda, Yamatokoriyama (JP); Hideki Nagasue, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 533 days.

(21) Appl. No.: 17/274,997

(22) PCT Filed: Aug. 2, 2019

(86) PCT No.: PCT/JP2019/030403
§ 371 (c)(1),
(2) Date: Mar. 10, 2021

(87) PCT Pub. No.: WO2020/059320
PCT Pub. Date: Mar. 26, 2020

(65) Prior Publication Data
US 2022/0055168 A1 Feb. 24, 2022

(30) Foreign Application Priority Data

Sep. 18, 2018 (JP) ................. 2018-173843

(51) Int. Cl.
*B23Q 11/08* (2006.01)
*B23Q 7/04* (2006.01)
(Continued)

(52) U.S. Cl.
CPC ............... *B23Q 15/12* (2013.01); *B23Q 7/04* (2013.01); *B23Q 11/0825* (2013.01);
(Continued)

(58) Field of Classification Search
CPC ....... B23Q 11/08–11/0891; B23Q 7/04–7/048; B23Q 2707/04;
(Continued)

(56) References Cited

U.S. PATENT DOCUMENTS

| 5,302,061 A | 4/1994 | Terawaki et al. |
| 2014/0286734 A1 | 9/2014 | Oda |

(Continued)

FOREIGN PATENT DOCUMENTS

| CN | 105817948 A | 8/2016 |
| CN | 107263200 A | 10/2017 |

(Continued)

OTHER PUBLICATIONS

International Search Report dated Sep. 17, 2019 in PCT/JP2019/030403 filed on Aug. 2, 2019, 2 pages.

*Primary Examiner* — Erica E Cadugan
(74) *Attorney, Agent, or Firm* — Oblon, McClelland, Maier & Neustadt, L.L.P.

(57) ABSTRACT

A machining system includes a cover body having an opening and defining a machining area of a workpiece, a door portion provided in the opening, an actuator that operates the door portion between a first position at which the opening is closed and a second position at which the opening is opened, a controller that controls the actuator, and a robot arm that operates through the opening to convey a workpiece between the machining area and an external area outside the machining area. The controller controls the actuator such that the door portion is positioned at a third position when the robot arm conveys the workpiece. An opening area of the opening when the door portion is positioned at the third position is smaller than an opening area of the opening when the door portion is positioned at the second position.

4 Claims, 10 Drawing Sheets

(51) Int. Cl.
*B23Q 15/12* (2006.01)
*G05B 19/4155* (2006.01)

(52) U.S. Cl.
CPC ...... *B23Q 11/0891* (2013.01); *G05B 19/4155* (2013.01); *G05B 2219/35398* (2013.01); *Y10T 409/30392* (2015.01)

(58) Field of Classification Search
CPC .. Y10T 409/30392; E05F 15/00–15/79; G05B 2219/45242
USPC ......................................................... 409/134
See application file for complete search history.

(56) References Cited

U.S. PATENT DOCUMENTS

| | | | |
|---|---|---|---|
| 2015/0308177 A1* | 10/2015 | Oda | E05F 15/41 49/31 |
| 2016/0214805 A1 | 7/2016 | Ebihara et al. | |
| 2017/0021467 A1* | 1/2017 | Suzuki | B23Q 11/0891 |
| 2017/0050282 A1* | 2/2017 | Kruck | B23Q 11/0891 |
| 2017/0096851 A1 | 4/2017 | Saitou | |
| 2017/0151642 A1* | 6/2017 | Suzuki | B23Q 11/0891 |
| 2017/0269569 A1 | 9/2017 | Ogawa | |
| 2017/0284146 A1 | 10/2017 | Maki | |
| 2019/0262957 A1* | 8/2019 | Sugiura | B23Q 7/04 |

FOREIGN PATENT DOCUMENTS

| | | |
|---|---|---|
| DE | 10 2017 002 486 A1 | 9/2017 |
| JP | 5-104391 A | 4/1993 |
| JP | 2004-114258 A | 4/2004 |
| JP | 2006-75916 A | 3/2006 |
| JP | 2006-82160 A | 3/2006 |
| JP | 2006-95666 A | 4/2006 |
| JP | 2014-205231 A | 10/2014 |
| JP | 2017-64875 A | 4/2017 |
| JP | 2017-164868 A | 9/2017 |
| WO | WO-2009/071073 A1 * | 6/2009 |

* cited by examiner

MACHINING SYSTEM

TECHNICAL FIELD

The present invention relates to a machining system.

BACKGROUND ART

With regard to a conventional machining system, for example, Japanese Patent Laying-Open No. 2014-205231 (PTL 1) discloses a machining system including: a machining apparatus having a door that is closed while machining is performed and that is opened while machining is not performed; a robot provided to be movable into and out of the machining apparatus through the door and serving to replace an object to be machined and/or a tool; and a robot controller that controls the robot.

The robot controller can control opening and closing of the door and also synchronously controls the robot and the door in accordance with the position and the posture of the robot and the position of the door. For example, the robot controller starts the operation of the robot to move into the machining apparatus before the door reaches an opened position, or starts the operation to close the door before the retraction operation of the robot completes.

CITATION LIST

Patent Literature

PTL 1: Japanese Patent Laying-Open No. 2014-205231

SUMMARY OF INVENTION

Technical Problem

As disclosed in the above-mentioned PTL 1, a machining system has been known that uses a robot to convey an object to be conveyed such as a workpiece into and out of a machining apparatus having a door that automatically performs opening and closing operations. Such a machining system requires driving of an actuator in order to automatically open and close the door, thereby resulting in poor energy saving performance.

Thus, an object of the present invention is to solve the above-described problem and to provide a machining system that is improved in energy saving performance.

Solution to Problem

A machining system according to the present invention includes: a cover body having an opening and defining a machining area of a workpiece; a door portion provided in the opening; an actuator that operates the door portion between a first position at which the opening is closed and a second position at which the opening is opened; a controller that controls the actuator; and a conveyance device that operates through the opening to convey an object to be conveyed between the machining area and an external area outside the machining area. The controller controls the actuator such that the door portion is positioned at a third position when the conveyance device conveys the object to be conveyed. An opening area of the opening opened when the door portion is positioned at the third position is smaller than an opening area of the opening opened when the door portion is positioned at the second position.

Advantageous Effects of Invention

According to the present invention, a machining system that is improved in energy saving performance can be provided.

DESCRIPTION OF EMBODIMENTS

Figure 1:
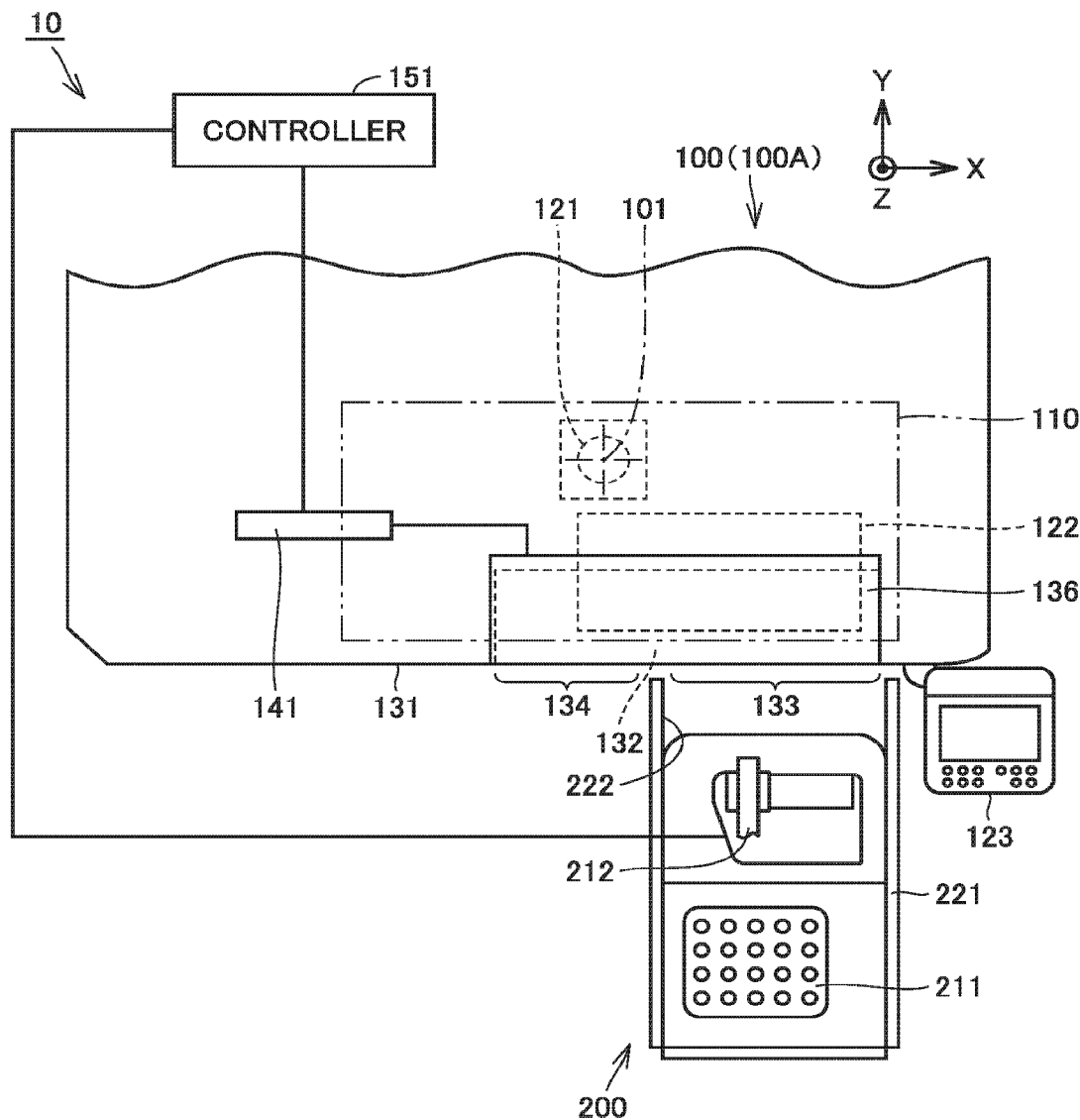
FIG. 1 is a top view showing a machining system according to the first embodiment of the present invention.

The embodiments of the present invention will be hereinafter described with reference to the accompanying drawings. In the accompanying drawings referred to below, the same or corresponding members will be denoted by the same reference characters.

First Embodiment

FIG. 1 is a top view showing a machining system according to the first embodiment of the present invention. Referring to FIG. 1, a machining system 10 according to the present embodiment includes a machine tool 100 and a conveyance unit 200.

Machine tool 100 machines a workpiece. Machine tool 100 is a numerically control (NC) machine tool performing various operations for workpiece machining that are automated by numerical control by a computer. Conveyance unit 200 is provided adjacent to machine tool 100. Conveyance unit 200 is a device for conveying a workpiece, which is an object to be conveyed, with respect to (into and out of) machine tool 100.

In the present embodiment, a vertical machining center 100A is provided as machine tool 100. Vertical machining center 100A includes a spindle 121, a table 122, a cover body 131, a door portion 136, an actuator 141, a controller 151, and an operation panel 123.

Spindle 121 is provided to be movable inside a machining area 110 for a workpiece. Spindle 121 is provided to be movable in a Z-axis direction parallel to the vertical direction. Spindle 121 is provided to be rotatable by motor driving around a central axis 101 parallel to the Z-axis. Spindle 121 is equipped with a clamp mechanism for detachably holding various tools.

Table 122 is provided to be movable inside machining area 110. Table 122 is provided to be movable in a plane (an X-Y plane) including: an X-axis direction (the right-left direction) parallel to the horizontal direction; and a Y-axis direction (the front-rear direction) parallel to the horizontal direction and orthogonal to the X-axis direction. On table 122, a workpiece mounting jig (not shown) for detachably holding a workpiece is provided.

Cover body 131, which is also called a splash guard, forms an outer appearance of vertical machining center 100A and defines machining area 110. Cover body 131 has an opening 132. Opening 132 is provided to open from the front surface to the upper surface of cover body 131 and is in communication with machining area 110.

Door portion 136 is provided in opening 132. Door portion 136 is provided to be slidable in the horizontal direction. Door portion 136 is provided to be slidable in the X-axis direction. When door portion 136 performs the opening and closing operations, opening 132 is brought into an opened state and a closed state accordingly. When door portion 136 is in the closed state, door portion 136 defines machining area 110 together with cover body 131. Door portion 136 is equipped with a transparent window (not shown) through which an operator can see the interior of machining area 110.

The operation of door portion 136 that is performed when the opening area of opening 132 increases is referred to as an "opening operation". The operation of door portion 136 that slides to the left in FIG. 1 corresponds to the "opening operation". The operation of door portion 136 that is performed when the opening area of opening 132 decreases is referred to as a "closing operation". The operation of door portion 136 that slides to the right in FIG. 1 corresponds to the "closing operation".

Actuator 141 is provided in cover body 131. Actuator 141 is connected to door portion 136. Actuator 141 is driven to cause door portion 136 to perform the opening and closing operations. The type of actuator 141 is not particularly limited, but may be a linear motion-type servo motor by way of example. Actuator 141 can stop door portion 136 at an arbitrary position.

Controller 151 controls vertical machining center 100A. Controller 151 is installed in vertical machining center 100A and serves as a control panel through which various operations in vertical machining center 100A are controlled. Controller 151 controls actuator 141. Controller 151 further controls a robot arm 212 in conveyance unit 200.

Operation panel 123 is configured in such a manner that various devices required to operate and adjust vertical machining center 100A are collectively arranged thereon. Operation panel 123 is provided on the front surface of cover body 131. Operation panel 123 is provided adjacent to opening 132. Operation panel 123 corresponds to an input unit through which a control program for actuator 141 is input.

Figure 2:
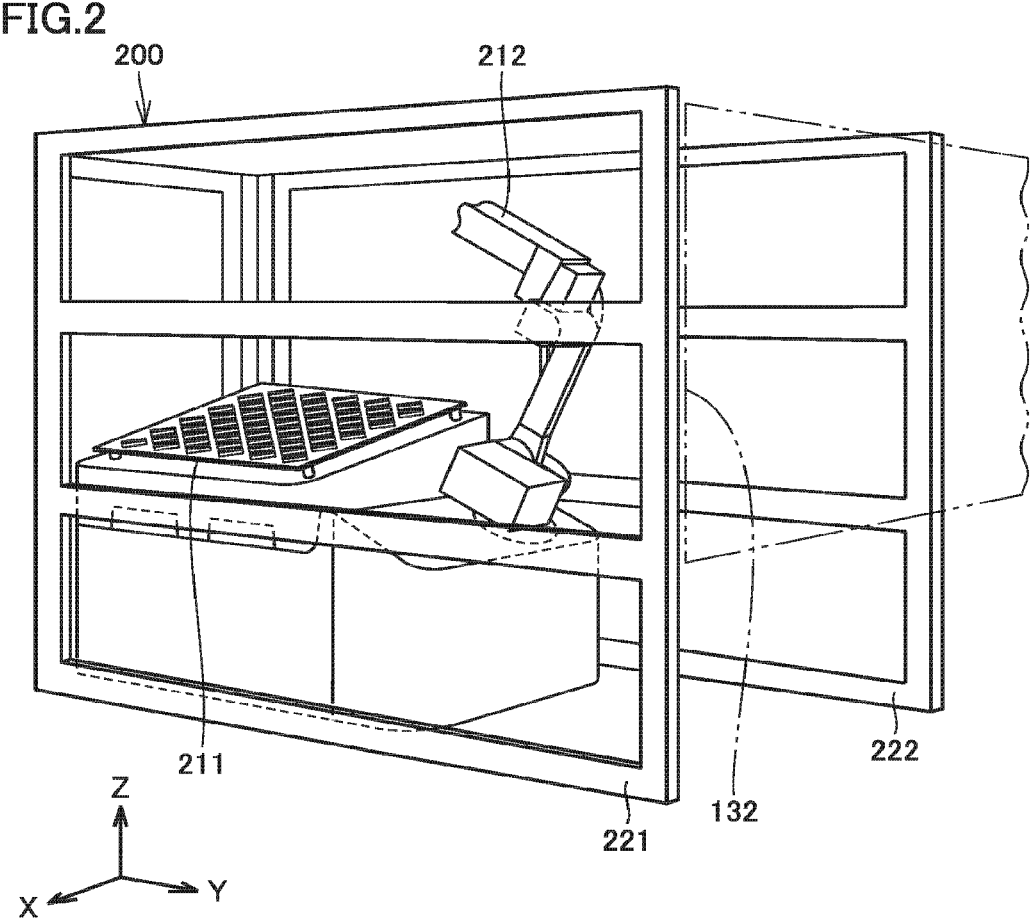
FIG. 2 is a perspective view showing a conveyance unit in FIG. 1.

FIG. 2 is a perspective view showing a conveyance unit in FIG. 1. Referring to FIGS. 1 and 2, conveyance unit 200 includes a robot arm 212, a workpiece mounting portion 211, and a guard body 221.

Robot arm 212 is provided adjacent to vertical machining center 100A in the Y-axis direction. Robot arm 212 is provided to face opening 132 (door portion 136 in the closed state). Robot arm 212 operates through opening 132 to convey a workpiece between machining area 110 and an external area outside this machining area 110. Robot arm 212 has a workpiece gripping portion (not shown) capable of gripping a workpiece. Robot arm 212 is a multi-joint robot having a plurality of axes (typically, six axes) that can be controlled independently of each other.

Workpiece mounting portion 211 is provided adjacent to robot arm 212. Workpiece mounting portion 211 is provided in an operation region of robot arm 212. Workpiece mounting portion 211 is provided on the opposite side of opening 132 (door portion 136 in the closed state) with robot arm 212 interposed therebetween. Opening 132 (door portion 136 in the closed state), robot arm 212, and workpiece mounting portion 211 are arranged in this order in the Y-axis direction.

Workpiece mounting portion 211 is configured such that a plurality of workpieces can be mounted thereon. By way of example, workpiece mounting portion 211 is formed of a plate member that is provided with a plurality of holes into which the respective workpieces can be inserted.

Guard body 221 is provided to surround robot arm 212 in the external area. Guard body 221 is provided to further surround workpiece mounting portion 211. Guard body 221 is provided to isolate the operation region of robot arm 212 from the operator in the external area. Guard body 221 is formed of a fence that surrounds robot arm 212 and workpiece mounting portion 211 from both sides in the X-axis direction and from one side in the Y-axis direction. Opening 222 of guard body 221 that is opened on the other side in the Y-axis direction faces opening 132 of cover body 131.

Opening 132 has a facing region 133 and a non-facing region 134. Facing region 133 faces guard body 221. Facing region 133 faces opening 222 of guard body 221 in the Y-axis direction. The space inside guard body 221 in which robot arm 212 and workpiece mounting portion 211 are disposed is in communication with machining area 110 through facing region 133 of opening 132.

Non-facing region 134 does not face guard body 221. Non-facing region 134 is provided adjacent to facing region 133 in the X-axis direction. The space outside guard body 221 in the external area is in communication with machining area 110 through non-facing region 134 of opening 132.

Figure 3:
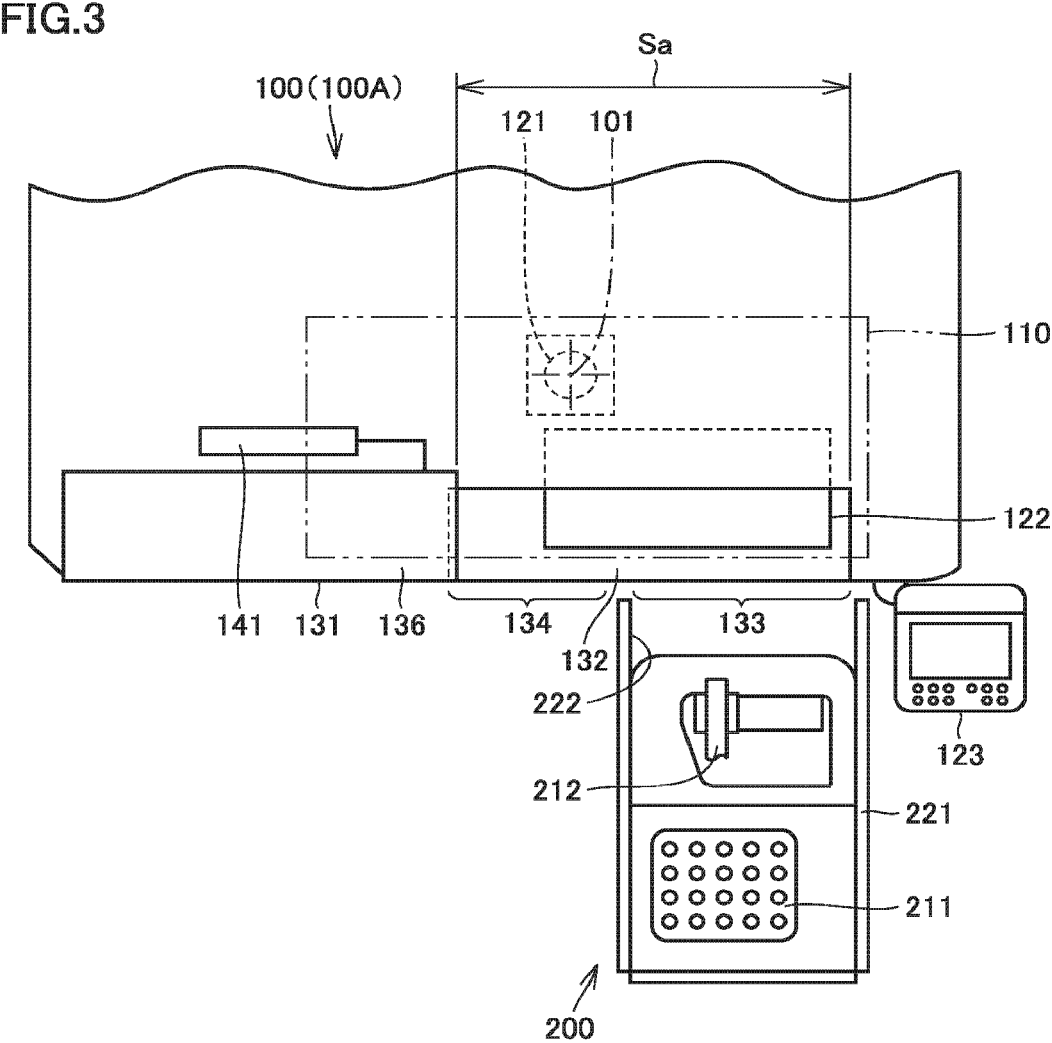
FIG. 3 is a top view showing the machining system in which a door portion is positioned at a second position.
Figure 4:
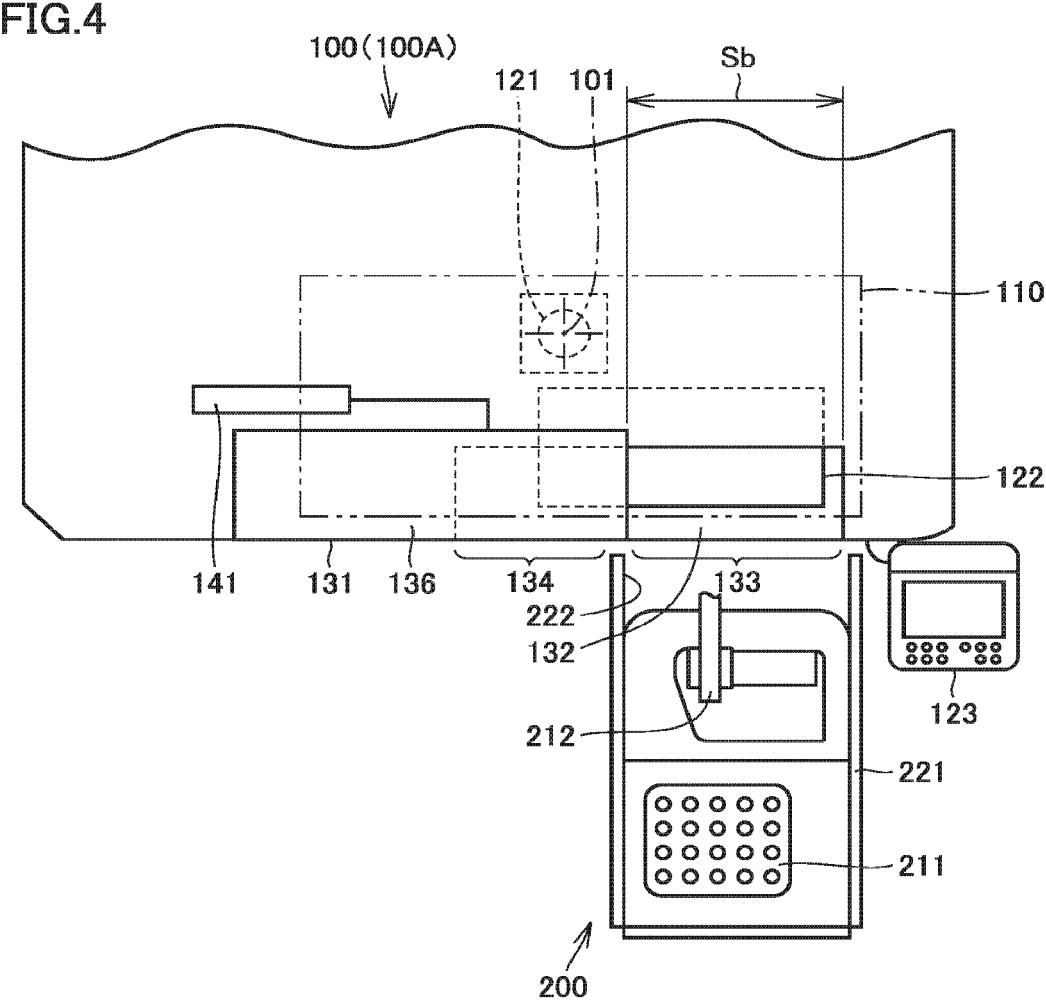
FIG. 4 is a top view showing the machining system in which the door portion is positioned at a third position.

FIG. 3 is a top view showing the machining system in which the door portion is positioned at the second position. FIG. 4 is a top view showing the machining system in which the door portion is positioned at the third position.

Referring to FIGS. 1 and 3, door portion 136 is driven by actuator 141 to perform the opening and closing operations between: the first position at which opening 132 is closed as shown in FIG. 1; and the second position at which opening 132 is opened as shown in FIG. 3.

When door portion 136 is positioned at the first position, the opening area of opening 132 is zero. Opening 132 is closed by door portion 136, thereby blocking machining area 110 from the external area. When the workpiece is machined in machining area 110, door portion 136 is positioned at the first position. The first position is located at one slide end of door portion 136 in the X-axis direction.

When door portion 136 is positioned at the second position, the opening area of opening 132 is Sa. Opening area Sa of opening 132 is the maximum value of the opening area of door portion 136 that changes in accordance with the opening and closing operations. When door portion 136 is positioned at the second position, opening 132 is in a fully opened state. The second position is located at the other slide end of door portion 136 in the X-axis direction.

Referring to FIG. 4, controller 151 (see FIG. 1) controls actuator 141 such that door portion 136 is positioned at the third position when robot arm 212 conveys a workpiece.

Referring to FIGS. 1, 3, and 4, when door portion 136 is positioned at the third position, the opening area of opening 132 is Sb. Opening area Sb of opening 132 opened when door portion 136 is positioned at the third position is smaller than opening area Sa of opening 132 opened when door portion 136 is positioned at the second position (Sb<Sa).

When door portion 136 is positioned at the third position, opening 132 is in a half-opened state. When door portion 136 is positioned at the third position, opening 132 is set to have a minimum opening area (opening degree) in which robot arm 212 can perform the operation to convey a workpiece. Door portion 136 positioned at the third position is located between, in the X-axis direction, door portion 136 positioned at the first position shown in FIG. 1 and door portion 136 positioned at the second position shown in FIG. 3.

As shown in FIG. 1, door portion 136 positioned at the first position closes facing region 133 and non-facing region 134 of opening 132. As shown in FIG. 3, door portion 136 positioned at the second position opens facing region 133 and non-facing region 134 of opening 132. As shown in FIG. 4, door portion 136 positioned at the third position opens facing region 133 and closes non-facing region 134.

Figure 5:
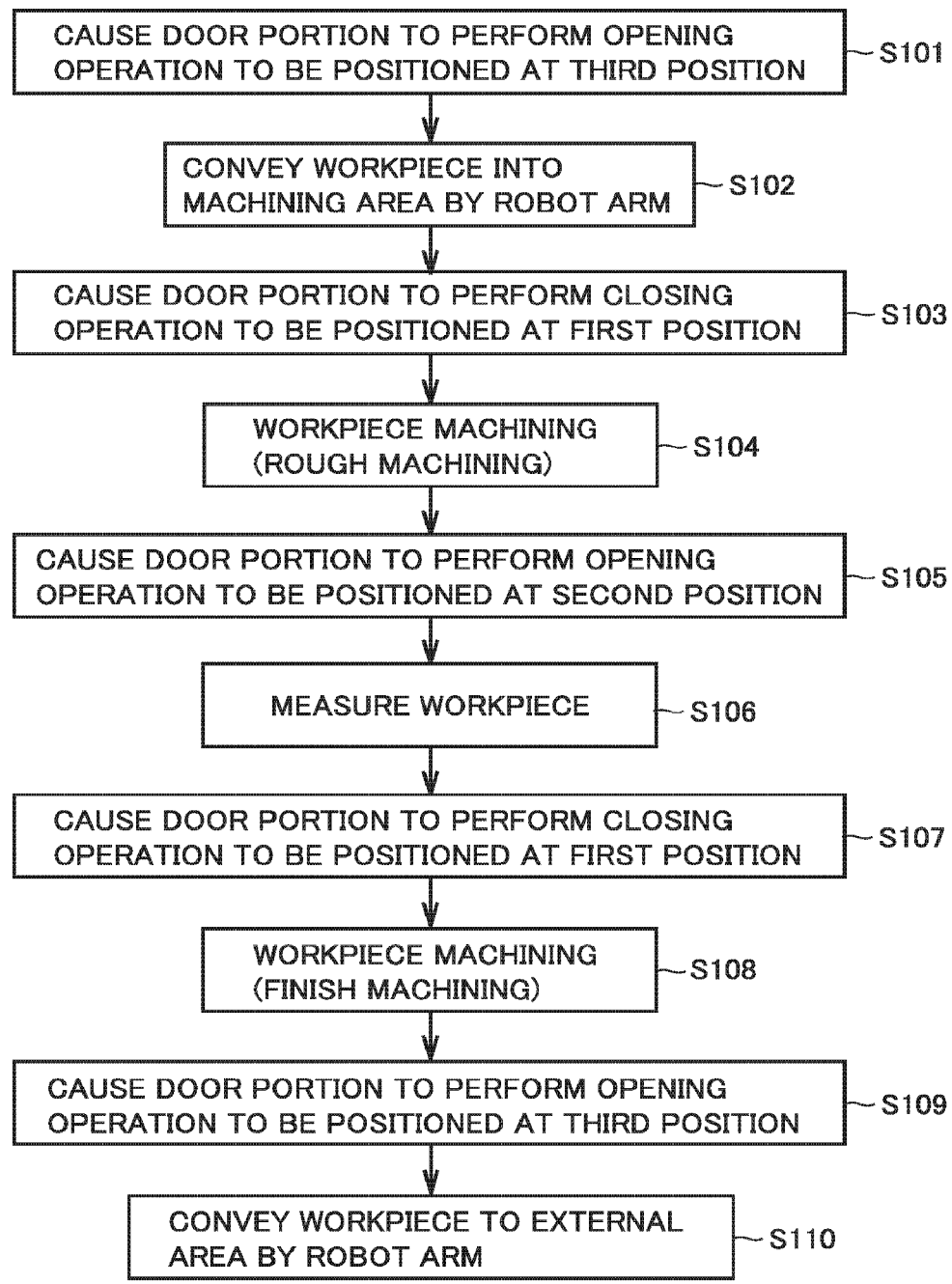
FIG. 5 is a flowchart showing an example of an operation of the machining system involved in workpiece machining.

FIG. 5 is a flowchart showing an example of an operation of the machining system involved in workpiece machining. The operation of machining system 10 described below is performed based on the control program that is input in advance into controller 151 by an operator through operation panel 123, unless otherwise specified.

Referring to FIGS. 1 and 5, door portion 136 is positioned at the first position as an initial state. Thereby, opening 132 is brought into a closed state.

Referring to FIGS. 4 and 5, controller 151 first controls actuator 141 such that door portion 136 performs an opening operation so as to be positioned at the third position (S101). Thereby, opening 132 is brought into a half-opened state.

Then, controller 151 controls robot arm 212 to convey the workpiece into machining area 110 (S102). In this step, robot arm 212 grips an un-machined workpiece mounted on workpiece mounting portion 211. Robot arm 212 moves through opening 132 into machining area 110. Further, robot arm 212 mounts the workpiece on a workpiece fixing jig (not shown) on table 122. Robot arm 212 retracts from machining area 110 through opening 132.

Referring to FIGS. 1 and 5, controller 151 then controls actuator 141 such that door portion 136 performs the closing operation so as to be positioned at the first position (S103). Thereby, opening 132 is brought into a closed state. Then, controller 151 controls vertical machining center 100A to perform workpiece machining (rough machining) (S104).

Referring to FIGS. 3 and 5, after completion of workpiece machining (rough machining), controller 151 controls actuator 141 such that door portion 136 performs an opening operation so as to be positioned at the second position (S105). Thereby, opening 132 is brought into a fully opened state. In this step, controller 151 may perform the opening operation of door portion 136 based on the command input by the operator through operation panel 123.

Then, the operator measures the workpiece (S106). The operator accesses the inside of machining area 110 through opening 132 that opens in non-facing region 134, to thereby measure the workpiece. The operator may correct the parameters for the subsequent finish machining of the workpiece based on the result of measuring the workpiece subjected to rough machining.

Referring to FIGS. 1 and 5, after completion of the measurement of the workpiece, controller 151 controls actuator 141 such that door portion 136 performs the closing operation so as to be positioned at the first position (S107). Thereby, opening 132 is brought into a closed state. In this step, controller 151 may cause door portion 136 to perform the closing operation based on the command input by the operator through operation panel 123.

Then, controller 151 controls vertical machining center 100A to perform workpiece machining (finish machining) (S108).

Referring to FIGS. 4 and 5, after completion of workpiece machining (finish machining), controller 151 controls actuator 141 such that door portion 136 performs an opening operation so as to be positioned at the third position (S109). Thereby, opening 132 is brought into a half-opened state.

Then, controller 151 controls robot arm 212 to convey the workpiece out of machining area 110 (S110). In this step, robot arm 212 moves through opening 132 into machining area 110. Robot arm 212 grips the machined workpiece mounted on the workpiece fixing jig (not shown) on table 122. Robot arm 212 retracts from machining area 110 through opening 132. Robot arm 212 places the workpiece on workpiece mounting portion 211.

As described above, in the present embodiment, when robot arm 212 conveys the workpiece (S102, S110), door portion 136 is positioned at the third position at which opening 132 has opening area Sb that is smaller than opening area Sa of opening 132 opened when door portion 136 is positioned at the second position. This suppresses the energy consumed by actuator 141 when door portion 136 performs the opening and closing operations before and after conveyance of the workpiece. Accordingly, the energy saving performance of machining system 10 can be improved.

In addition, door portion 136 is positioned such that opening 132 is opened at the minimum opening degree required for robot arm 212 to convey the workpiece. Thus, the time required for the opening and closing operations of door portion 136 before and after conveyance of the workpiece can be shortened. Thereby, the effect of shortening the cycle time of workpiece machining in machining system 10 is also achieved.

Further, door portion 136 positioned at the third position shown in FIG. 4 opens facing region 133 of opening 132 and closes non-facing region 134 of opening 132. Such a configuration allows robot arm 212 to convey the workpiece through facing region 133 of opening 132. Further, robot arm 212 is surrounded by guard body 221 and non-facing region 134 of opening 132 is closed by door portion 136. Thereby, the operator can be prevented from entering the operation region of robot arm 212.

Figure 6:
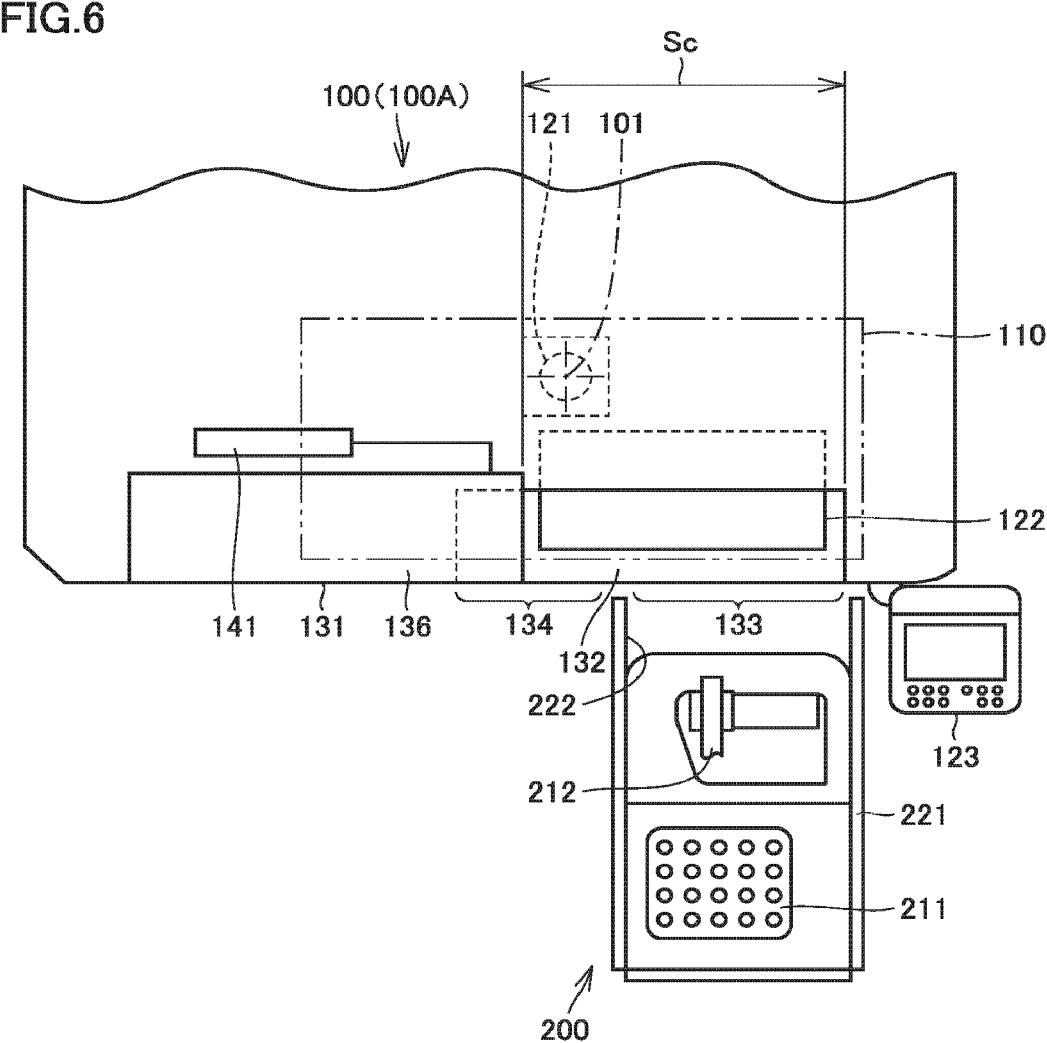
FIG. 6 is a top view showing the machining system in which the door portion is positioned at a fourth position.

FIG. 6 is a top view showing the machining system in which the door portion is positioned at the fourth position. Referring to FIG. 6, controller 151 (see FIG. 1) may control actuator 141 such that door portion 136 is positioned at the fourth position when robot arm 212 does not convey the workpiece and when workpiece machining in machining area 110 is stopped.

When door portion 136 is positioned at the fourth position, the opening area of opening 132 is Sc. Opening area Sc of opening 132 opened when door portion 136 is positioned at the fourth position is smaller than opening area Sa of opening 132 opened when door portion 136 is positioned at the second position (Sc<Sa).

Door portion 136 positioned at the fourth position is located between, in the X-axis direction, door portion 136 positioned at the third position shown in FIG. 4 and door portion 136 positioned at the second position shown in FIG. 3. Door portion 136 positioned at the fourth position opens facing region 133 and a part of non-facing region 134 and closes the remaining part of non-facing region 134.

In such a configuration, when robot arm 212 does not convey the workpiece and when the workpiece machining in machining area 110 is stopped, the operator can perform various operations through opening 132 that is opened in a part of non-facing region 134. For example, the operator may clean the interior of machining area 110. The operator may perform the measurement of the workpiece as described in S106 in FIG. 5 in the state where door portion 136 is positioned at the fourth position.

In this case, door portion 136 is positioned at the fourth position at which opening 132 has an opening area that is smaller than the opening area of opening 132 opened when door portion 136 is positioned at the second position. Accordingly, the energy consumed by actuator 141 during the opening and closing operations of door portion 136 can be suppressed. In addition, when the interior of machining area 110 is cleaned, the effect of suppressing scattering of a coolant, chippings and the like in the external area due to air blowing during cleaning is also achieved.

The following summarizes the above-described structure of machining system 10 according to the first embodiment of the present invention. Specifically, machining system 10 according to the present embodiment includes: a cover body 131 having an opening 132 and defining a machining area 110 of a workpiece; a door portion 136 provided in opening 132; an actuator 141 that operates door portion 136 between a first position at which opening 132 is closed and a second position at which opening 132 is opened; a controller 151 that controls actuator 141; and a robot arm 212 as a conveyance device that operates through opening 132 to convey the workpiece as an object to be conveyed between machining area 110 and an external area outside machining area 110. Controller 151 controls actuator 141 such that door portion 136 is positioned at a third position when robot arm 212 conveys the workpiece. An opening area Sb of opening 132 opened when door portion 136 is positioned at the third position is smaller than an opening area Sa of opening 132 opened when door portion 136 is positioned at the second position.

Machining system 10 according to the first embodiment of the present invention that is configured as described above can suppress the energy consumed by actuator 141 to cause door portion 136 to perform the opening and closing operations before and after conveyance of the workpiece. Thereby, the energy saving performance of machining system 10 can be improved.

The present embodiment has been described above with regard to the case where the conveyance device is robot arm 212 as a multi joint robot, but the present invention is not limited thereto. The conveyance device of the present invention may be, for example, a linear motion-type workpiece conveyance device that conveys a workpiece in a linear direction. Furthermore, the object to be conveyed that is conveyed by the conveyance device is not limited to a workpiece but may be a tool, for example.

Second Embodiment

Figure 7:
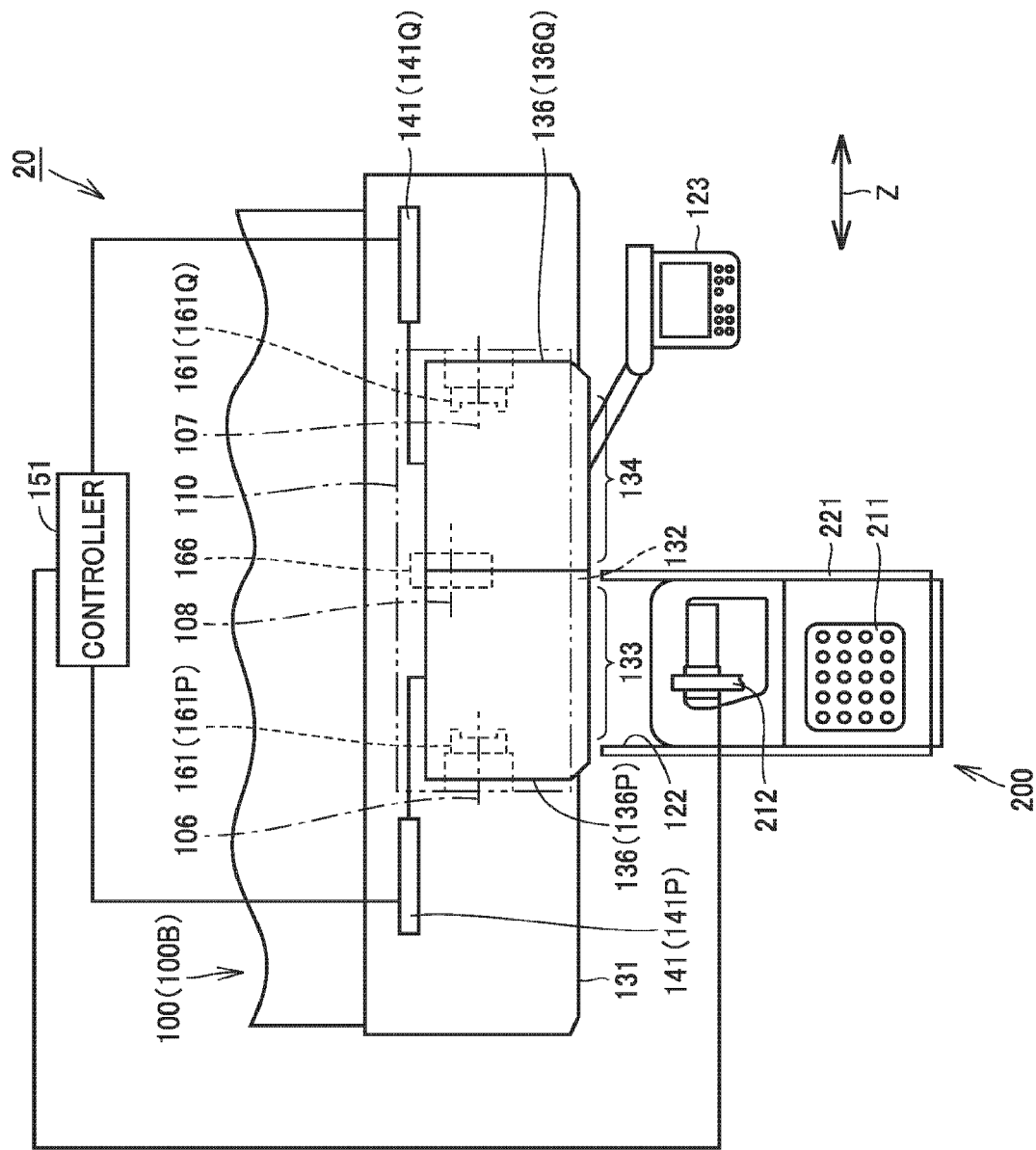
FIG. 7 is a top view showing a machining system according to the second embodiment of the present invention.

FIG. 7 is a top view showing a machining system according to the second embodiment of the present invention. The machining system according to the present embodiment has basically the same structure as that of the machining system according to the first embodiment. Thus, the description of the same structure will not be hereinafter repeated.

Referring to FIG. 7, a machining system 20 in the present embodiment is equipped with a lathe 100B as machine tool 100.

Lathe 100B includes a spindle 161 (a first spindle 161P, a second spindle 161Q), a tool rest 166, a cover body 131, a door portion 136 (a first door portion 136P, a second door portion 136Q), an actuator 141 (a first actuator 141P, a second actuator 141Q), a controller 151, and an operation panel 123.

First spindle 161P and second spindle 161Q are disposed to face each other in a Z-axis direction (the right-left direction) parallel to the horizontal direction. First spindle 161P is disposed to be rotatable about a central axis 106 parallel to the Z-axis. Second spindle 161Q is disposed to be rotatable about a central axis 107 that extends in parallel to the Z-axis along the line extending from central axis 106. First spindle 161P and second spindle 161Q are equipped with a chuck mechanism for detachably holding a workpiece.

Tool rest 166 is configured such that a plurality of tools can be mounted thereon. Tool rest 166 is a so-called turret type of rest and equipped with a plurality of tools radially arranged for swivel indexing. More specifically, tool rest 166 is disposed to be swivelable around a central axis 108 parallel to the Z-axis. Further, tool holders for holding respective tools are attached at positions around central axis 108 to be spaced apart from each other in the circumferential direction of central axis 108. As tool rest 166 swivels around central axis 108, the tools held by the respective tool holders move in the circumferential direction, and thus, a tool used for machining is indexed.

Second spindle 161Q is disposed to be movable in the Z-axis direction. Tool rest 166 is disposed to be movable in the Z-axis direction and in the X-axis direction that is orthogonal to the Z-axis and inclined with respect to the vertical direction.

Door portion 136 is a type of double doors including a first door portion 136P and a second door portion 136Q that closes opening 132 together with first door portion 136P. First door portion 136P and second door portion 136Q are disposed side by side in the Z-axis direction. First door portion 136P and second door portion 136Q are disposed to be slidable in the Z-axis direction.

Actuator 141 includes a first actuator 141P and a second actuator 141Q. First actuator 141P causes first door portion 136P to perform the opening and closing operations. Second actuator 141Q causes second door portion 136Q to perform the opening and closing operations. In such a configuration, first door portion 136P and second door portion 136Q are driven by first actuator 141P and second actuator 141Q, respectively, to be capable of performing the opening and closing operations independently from each other.

Figure 8:
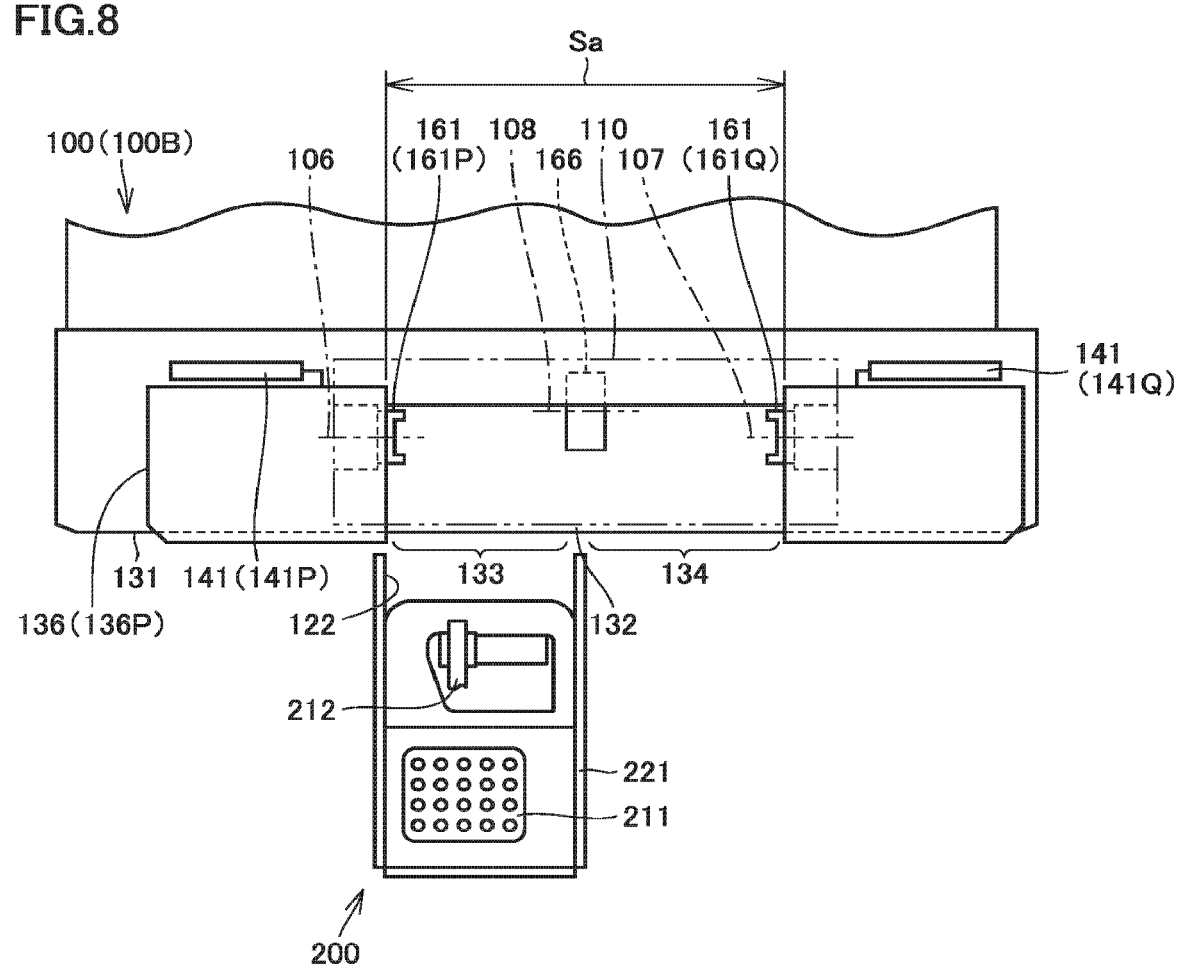
FIG. 8 is a top view showing the machining system in which a door portion is positioned at a second position.

FIG. 8 is a top view showing the machining system in which the door portion is positioned at the second position. Referring to FIGS. 7 and 8, door portion 136 (first door portion 136P, second door portion 136Q) is driven by actuator 141 (first actuator 141P, second actuator 141Q) to perform the opening and closing operations between the first position at which opening 132 is closed as shown in FIG. 7 and the second position at which opening 132 is opened as shown in FIG. 8.

When door portion 136 (first door portion 136P, second door portion 136Q) is positioned at the first position, the opening area of opening 132 is zero. When door portion 136 (first door portion 136P, second door portion 136Q) is positioned at the second position, the opening area of opening 132 is Sa.

Opening 132 has a facing region 133 and a non-facing region 134. Facing region 133 faces guard body 221. Facing region 133 is closed by first door portion 136P positioned at the first position. Non-facing region 134 does not face guard body 221. Non-facing region 134 is closed by second door portion 136Q positioned at the first position.

Figure 9:
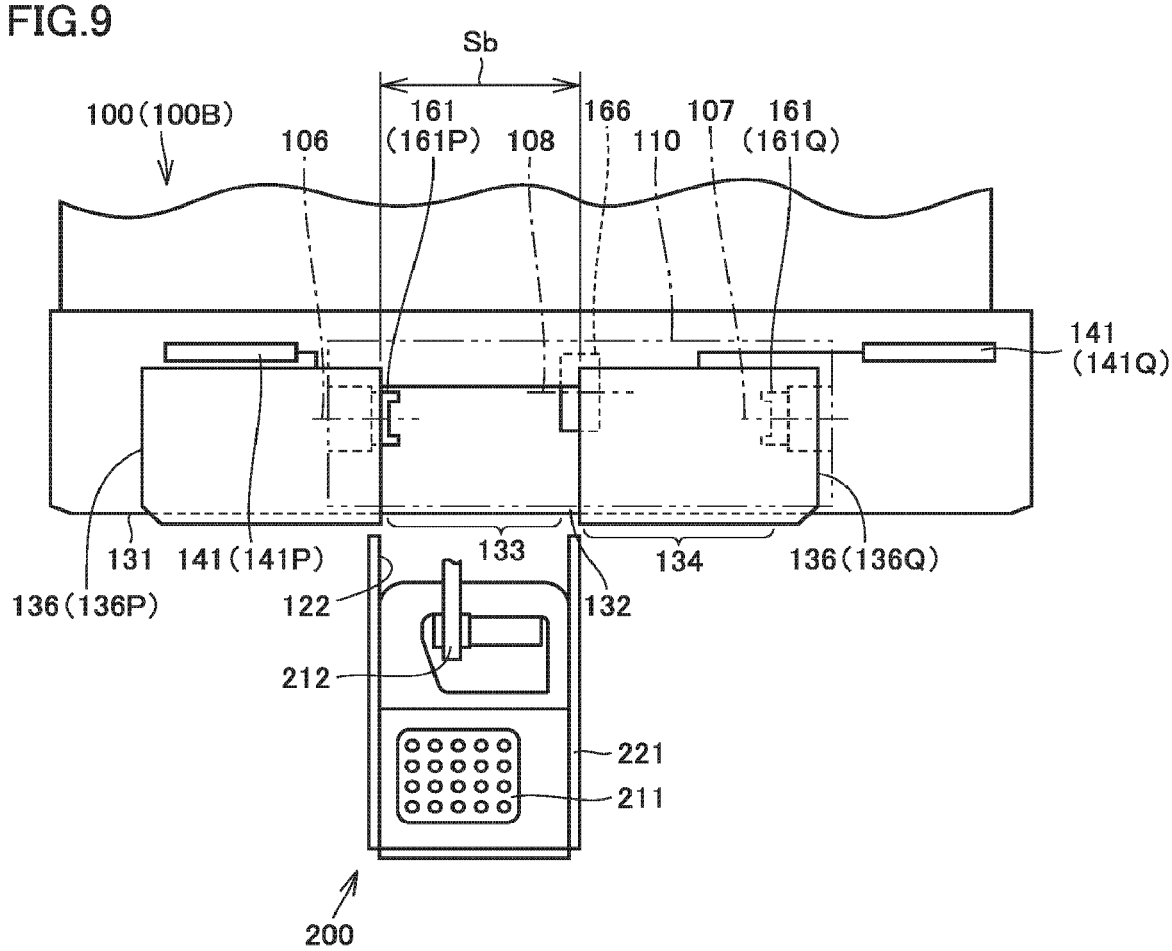
FIG. 9 is a top view showing the machining system in which the door portion is positioned at a third position.

FIG. 9 is a top view showing the machining system in which the door portion is positioned at the third position. Referring to FIG. 9, controller 151 (see FIG. 7) controls actuator 141 (first actuator 141P, second actuator 141Q) such that door portion 136 (first door portion 136P, second door portion 136Q) is positioned at the third position when robot arm 212 conveys a workpiece.

Opening area Sb of opening 132 opened when door portion 136 (first door portion 136P, second door portion 136Q) is positioned at the third position is smaller than opening area Sa of opening 132 opened when door portion 136 (first door portion 136P, second door portion 136Q) is positioned at the second position (Sb<Sa).

Controller 151 controls first actuator 141P and second actuator 141Q such that only first door portion 136P among first door portion 136P and second door portion 136Q performs the opening operation when robot arm 212 conveys a workpiece.

In such a configuration, only first door portion 136P among first door portion 136P and second door portion 136Q performs the opening operation, so that the energy consumed by actuator 141 to cause door portion 136 to perform the opening and closing operations can be suppressed. Thereby, the energy saving performance of machining system 20 can be improved.

Figure 10:
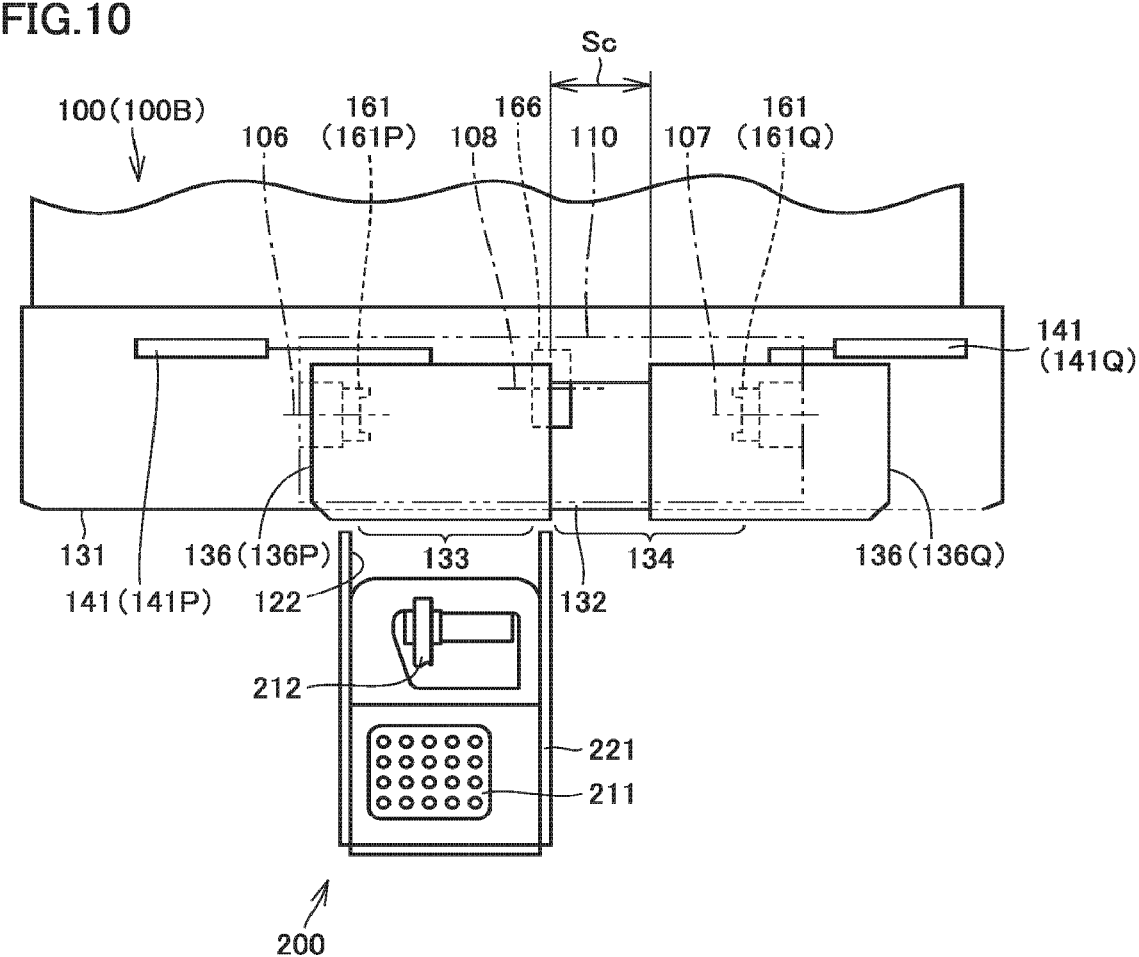
FIG. 10 is a top view showing the machining system in which the door portion is positioned at a fourth position.

FIG. 10 is a top view showing the machining system in which the door portion is positioned at the fourth position. Referring to FIG. 10, controller 151 (sec FIG. 7) may control actuator 141 (first actuator 141P, second actuator 141Q) such that door portion 136 (first door portion 136P, second door portion 136Q) is positioned at the fourth position when robot arm 212 does not convey a workpiece and when workpiece machining in machining area 110 is stopped.

When door portion 136 (first door portion 136P, second door portion 136Q) is positioned at the fourth position, the opening area of opening 132 is Sc.

Opening area Sc of opening 132 opened when door portion 136 (first door portion 136P, second door portion 136Q) is positioned at the fourth position is smaller than opening area Sa of opening 132 opened when door portion 136 (first door portion 136P, second door portion 136Q) is positioned at the second position (Sc<Sa). Opening area Sc of opening 132 opened when door portion 136 (first door portion 136P, second door portion 136Q) is positioned at the fourth position is further smaller than opening area Sb of opening 132 opened when door portion 136 (first door portion 136P, second door portion 136Q) is positioned at the third position (Sc<Sb).

First door portion 136P positioned at the fourth position is positioned at the same position as that of first door portion 136P positioned at the first position. First door portion 136P positioned at the fourth position closes facing region 133. Second door portion 136Q positioned at the fourth position is positioned between, in the X-axis direction, second door portion 136Q positioned at the first position and second door portion 136Q positioned at the second position. Second door portion 136Q positioned at the fourth position opens a part of non-facing region 134 and closes the remaining part of non-facing region 134.

According to the configuration as described above, door portion 136 is positioned at the fourth position at which opening 132 has an opening area that is smaller than the opening areas of opening 132 opened when door portion 136 is positioned at the second position and the third position. Thereby, the energy consumed by actuator 141 to cause door portion 136 to perform the opening and closing operations can be suppressed.

According to machining system 20 in the second embodiment of the present invention that is configured as described above, the effect described in the first embodiment can be similarly achieved.

The machining apparatus to which the machining system of the present invention is applied is not limited to a vertical machining center and a lathe. For example, the present invention may also be applicable to: a horizontal machining center; a composite machining apparatus having a turning function using a fixed tool and a milling function using a rotating tool; a machining apparatus capable of performing subtractive manufacturing and additive manufacturing; or the like.

The following describes a summary of the configuration and the functions and effects of the present invention.

A machining system according to the present invention includes: a cover body having an opening and defining a machining area of a workpiece; a door portion provided in the opening; an actuator that operates the door portion between a first position at which the opening is closed and a second position at which the opening is opened; a controller that controls the actuator; and a conveyance device that operates through the opening to convey an object to be conveyed between the machining area and an external area outside the machining area. The controller controls the actuator such that the door portion is positioned at a third position when the conveyance device conveys the object to be conveyed. An opening area of the opening opened when the door portion is positioned at the third position is smaller than an opening area of the opening opened when the door portion is positioned at the second position.

According to the machining system configured as described above, when the conveyance device conveys the object to be conveyed, the door portion is positioned at the third position at which the opening has an opening area that is smaller than the opening area of the opening opened when the door portion is positioned at the second position. Thus, the energy consumed by the actuator to cause the door portion to perform the opening and closing operations can be suppressed. Thereby, in the machining system including the door portion that automatically opens and closes, the energy saving performance can be improved.

Preferably, the machining system further includes a guard body that surrounds the conveyance device in the external area. The opening includes a facing region that faces the guard body and a non-facing region that does not face the guard body. The door portion positioned at the third position opens the facing region and closes the non-facing region. The door portion positioned at the second position opens the facing region and the non-facing region.

According to the machining system configured as described above, when the door portion is positioned at the third position, the conveyance device can convey the object to be conveyed through the facing region of the opening. On the other hand, the conveyance device is surrounded by the guard body and the non-facing region of the opening is closed by the door portion, so that the operator can be prevented from entering the operation region of the conveyance device.

Further preferably, the controller controls the actuator such that the door portion is positioned at a fourth position when the conveyance device does not convey the object to be conveyed and when workpiece machining in the machining area is stopped. An opening area of the opening opened when the door portion is positioned at the fourth position is smaller than an opening area of the opening opened when the door portion is positioned at the second position.

According to the machining system configured as described above, when the conveyance device does not convey the object to be conveyed and when workpiece machining in the machining area is stopped, the operator can perform various operations in the machining area through the opening. In this case, the opening area of the opening opened when the door portion is positioned at the fourth position is smaller than the opening area of the opening opened when the door portion is positioned at the second position. Thus, the energy consumed by the actuator to cause the door portion to perform the opening and closing operations can be suppressed.

Further preferably, the opening area of the opening opened when the door portion is positioned at the fourth position is further smaller than the opening area of the opening opened when the door portion is positioned at the third position.

According to the machining system configured as described above, the energy consumed by the actuator to cause the door portion to perform the opening and closing operations can be further suppressed.

Further preferably, the machining system further includes an input unit through which a control program for the actuator is input into the controller. The controller controls the actuator based on the control program input through the input unit.

According to the machining system configured as described above, during the progress of workpiece machining, the door portion can be caused to perform the opening and closing operations based on the control program input in advance.

Further preferably, the door portion includes a first door portion and a second door portion that closes the opening together with the first door portion. The controller controls the actuator such that one of the first door portion and the second door portion performs the opening operation when the conveyance device conveys the object to be conveyed.

According to the machining system configured as described above, only one of the doors configured as double doors is caused to perform the opening operation when the conveyance device conveys the object to be conveyed. Thereby, the energy saving performance can be improved.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present invention is applicable mainly to a machining system including a door portion that automatically performs opening and closing operations.

REFERENCE SIGNS LIST 10, 20 machining system, 100 machine tool, 100A vertical machining center, 100B lathe, 101, 106, 107, 108 central axis, 110 machining area, 121 spindle, 122 table, 123 control panel, 131 cover body, 132, 222 opening, 133 facing region, 134 non-facing region, 136 door portion, 136P first door portion, 136Q second door portion, 141 actuator, 141P first actuator, 141Q second actuator, 151 controller, 161 spindle, 161P first spindle, 161Q second spindle, 166 tool rest, 200 conveyance unit, 211 workpiece mounting portion, 212 robot arm, 221 guard body.

The invention claimed is:

1. A machining system, comprising:
a cover body having an opening and defining a machining area that is a space in which a workpiece is machined;
a door portion provided in the opening;
an actuator that operates the door portion between a first position at which the opening is closed and a second position at which the opening is open;
a controller that controls the actuator; and
a conveyance device that operates through the opening to convey an object between the machining area and an external area outside the machining area, wherein
the controller controls the actuator such that the door portion is positioned at a third position when the conveyance device conveys the object,
an opening area of the opening when the door portion is positioned at the third position is smaller than an opening area of the opening when the door portion is positioned at the second position,
the machining system further comprises a guard body that surrounds the conveyance device in the external area,
the opening includes
a facing region that faces the guard body, and
a non-facing region that does not face the guard body,
the door portion positioned at the third position opens the facing region and closes the non-facing region, and
the door portion positioned at the second position opens the facing region and the non-facing region.

2. The machining system according to claim 1, wherein
the controller controls the actuator such that the door portion is positioned at a fourth position when the conveyance device does not convey the object and when workpiece machining in the machining area is stopped, and
an opening area of the opening when the door portion is positioned at the fourth position is smaller than the opening area of the opening when the door portion is positioned at the second position.

3. The machining system according to claim 1, further comprising input circuitry through which a control program for the actuator is input into the controller, wherein
the controller controls the actuator based on the control program input through the input circuitry.

4. The machining system according to claim 1, wherein
the door portion includes a first door portion and a second door portion that closes the opening together with the first door portion,
the actuator includes
a first actuator that causes the first door portion to perform opening and closing operations, and
a second actuator that causes the second door portion to perform opening and closing operations, and
the controller controls the first actuator and the second actuator such that one of the first door portion and the second door portion performs an opening operation when the conveyance device conveys the object.

* * * * *